United States Patent
Lee et al.

(10) Patent No.: US 9,426,818 B2
(45) Date of Patent: Aug. 23, 2016

(54) METHOD AND APPARATUS FOR PERFORMING COORDINATED MULTI-POINT TRANSMISSION AND RECEPTION IN WIRELESS COMMUNICATION SYSTEM

(75) Inventors: Won-Mu Lee, Seoul (KR); Hun-Kee Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 453 days.

(21) Appl. No.: 12/944,881

(22) Filed: Nov. 12, 2010

(65) Prior Publication Data

US 2011/0124345 A1  May 26, 2011

(30) Foreign Application Priority Data

Nov. 24, 2009 (KR) .................. 10-2009-0113886

(51) Int. Cl.
H04W 72/00 (2009.01)
H04W 72/12 (2009.01)

(52) U.S. Cl.
CPC ........ *H04W 72/1231* (2013.01); *H04W 72/121* (2013.01)

(58) Field of Classification Search
CPC ... H04W 84/045; H04W 24/10; H04W 24/02; H04W 52/244; H04W 72/1226; H04W 40/00; H04W 72/121; H04B 7/0632; H04B 7/0452; H04J 11/0053; H04L 5/0051; H04L 5/005
USPC .......... 455/524, 525, 452.2, 63.1, 522, 562.2, 455/550, 435.1–435.3, 436–444, 452.1; 370/328
See application file for complete search history.

(56) References Cited

U.S. PATENT DOCUMENTS

| | | | | |
|---|---|---|---|---|
| 5,592,490 | A * | 1/1997 | Barratt et al. ................. | 370/310 |
| 7,668,564 | B2 * | 2/2010 | Onggosanusi et al. ....... | 455/522 |
| 7,944,906 | B2 * | 5/2011 | Xu et al. ....................... | 370/349 |
| 8,055,198 | B2 * | 11/2011 | Benes et al. ................. | 455/63.1 |
| 8,077,664 | B2 * | 12/2011 | Zangi ............................ | 370/328 |
| 8,078,185 | B2 * | 12/2011 | Sun et al. ..................... | 455/450 |
| 8,873,650 | B2 * | 10/2014 | Zhuang ................ | H04L 5/0037 375/260 |
| 2007/0094417 | A1 | 4/2007 | Hur et al. | |
| 2007/0287506 | A1 | 12/2007 | Kim et al. | |
| 2008/0045260 | A1 * | 2/2008 | Muharemovic ..... | H04W 52/286 455/522 |
| 2008/0058022 | A1 | 3/2008 | Ahn | |

(Continued)

FOREIGN PATENT DOCUMENTS

| | | | |
|---|---|---|---|
| KR | 10-0606803 | B1 | 7/2006 |
| KR | 10-2005-0087221 | B1 | 8/2006 |

(Continued)

*Primary Examiner* — Mahendra Patel
(74) *Attorney, Agent, or Firm* — Jefferson IP Law, LLP

(57) ABSTRACT

A method and an apparatus for performing a Coordinated Multi-Point (CoMP) transmission in a wireless communication system are provided. An operating method of a base station for the CoMP transmission in a wireless communication system includes performing a cell clustering for CoMP transmission of a terminal, receiving a reference signal from the terminal, determining cell IDentifier (ID) information of the terminal, when the terminal uses a cell ID for the CoMP transmission, comparing a Channel Quality Indicator (CQI) value of the reference signal with a threshold, and when the CQI value of the reference signal is greater than or equal to the threshold, participating in the CoMP transmission of the terminal.

20 Claims, 5 Drawing Sheets

(56) References Cited

U.S. PATENT DOCUMENTS

| | | | |
|---|---|---|---|
| 2008/0102822 A1* | 5/2008 | Feng et al. | 455/425 |
| 2008/0186911 A1* | 8/2008 | Bachl et al. | 370/329 |
| 2008/0214121 A1* | 9/2008 | Sutivong et al. | 455/67.13 |
| 2008/0233967 A1* | 9/2008 | Montojo et al. | 455/452.2 |
| 2008/0268833 A1* | 10/2008 | Huang et al. | 455/425 |
| 2009/0080569 A1* | 3/2009 | Han | H04L 5/0007 375/316 |
| 2009/0197538 A1* | 8/2009 | Borran et al. | 455/63.1 |
| 2009/0197590 A1* | 8/2009 | Borran et al. | 455/423 |
| 2009/0247086 A1* | 10/2009 | Lin et al. | 455/67.11 |
| 2009/0247181 A1* | 10/2009 | Palanki et al. | 455/452.2 |
| 2009/0257390 A1* | 10/2009 | Ji et al. | 370/329 |
| 2009/0264142 A1* | 10/2009 | Sankar et al. | 455/501 |
| 2009/0264143 A1 | 10/2009 | Satou | |
| 2009/0274076 A1* | 11/2009 | Muharemovic et al. | 370/280 |
| 2010/0002664 A1* | 1/2010 | Pan | F03B 13/00 370/338 |
| 2010/0008244 A1* | 1/2010 | Sampath et al. | 370/252 |
| 2010/0009705 A1* | 1/2010 | Budianu et al. | 455/501 |
| 2010/0027454 A1* | 2/2010 | Hou et al. | 370/312 |
| 2010/0034157 A1* | 2/2010 | Stolyar et al. | 370/329 |
| 2010/0056057 A1* | 3/2010 | Benes et al. | 455/63.1 |
| 2010/0056171 A1* | 3/2010 | Ramprashad et al. | 455/452.1 |
| 2010/0067450 A1* | 3/2010 | Balachandran et al. | 370/329 |
| 2010/0075689 A1* | 3/2010 | Uemura et al. | 455/452.1 |
| 2010/0098012 A1* | 4/2010 | Bala | H04L 5/001 370/329 |
| 2010/0142466 A1* | 6/2010 | Palanki et al. | 370/329 |
| 2010/0157826 A1* | 6/2010 | Yu et al. | 370/252 |
| 2010/0177746 A1* | 7/2010 | Gorokhov et al. | 370/336 |
| 2010/0190447 A1* | 7/2010 | Agrawal et al. | 455/63.1 |
| 2010/0195527 A1* | 8/2010 | Gorokhov et al. | 370/252 |
| 2010/0208610 A1* | 8/2010 | Ihm et al. | 370/252 |
| 2010/0238984 A1* | 9/2010 | Sayana | H04B 7/0634 375/219 |
| 2010/0248728 A1* | 9/2010 | Sun et al. | 455/450 |
| 2010/0271970 A1* | 10/2010 | Pan | H04L 1/0026 370/252 |
| 2010/0304682 A1* | 12/2010 | Choi et al. | 455/63.1 |
| 2011/0007685 A1* | 1/2011 | Ma et al. | 370/315 |
| 2011/0038310 A1* | 2/2011 | Chmiel et al. | 370/328 |
| 2011/0075611 A1* | 3/2011 | Choi | H04L 1/1819 370/329 |
| 2011/0085457 A1* | 4/2011 | Chen et al. | 370/252 |
| 2011/0124345 A1* | 5/2011 | Lee et al. | 455/452.2 |
| 2011/0130098 A1* | 6/2011 | Madan et al. | 455/63.1 |
| 2011/0130099 A1* | 6/2011 | Madan et al. | 455/63.1 |
| 2011/0149879 A1* | 6/2011 | Noriega et al. | 370/329 |
| 2011/0170438 A1* | 7/2011 | Kishiyama et al. | 370/252 |
| 2011/0183669 A1* | 7/2011 | Kazmi | 455/434 |
| 2011/0188481 A1* | 8/2011 | Damnjanovic et al. | 370/336 |
| 2011/0216842 A1* | 9/2011 | Zhang et al. | 375/260 |
| 2011/0217985 A1* | 9/2011 | Gorokhov | 455/452.2 |
| 2011/0269459 A1* | 11/2011 | Koo et al. | 455/434 |
| 2011/0286423 A1* | 11/2011 | Berggren et al. | 370/329 |
| 2011/0294527 A1* | 12/2011 | Brueck et al. | 455/466 |
| 2011/0317656 A1* | 12/2011 | Rajih et al. | 370/330 |
| 2011/0319084 A1* | 12/2011 | Meshkati et al. | 455/436 |
| 2012/0008511 A1* | 1/2012 | Fan et al. | 370/252 |
| 2012/0014476 A1* | 1/2012 | Kuchi et al. | 375/296 |
| 2012/0021753 A1* | 1/2012 | Damnjanovic et al. | 455/450 |
| 2012/0040620 A1* | 2/2012 | Fu et al. | 455/63.1 |
| 2012/0087273 A1* | 4/2012 | Koo et al. | 370/252 |
| 2012/0087442 A1* | 4/2012 | Xu | H04L 5/0051 375/299 |
| 2012/0135766 A1* | 5/2012 | Garavaglia et al. | 455/509 |
| 2012/0170679 A1* | 7/2012 | Koo et al. | 375/295 |

FOREIGN PATENT DOCUMENTS

| | | |
|---|---|---|
| KR | 10-0753041 B1 | 8/2007 |
| KR | 10-2008-0021442 A | 3/2008 |

* cited by examiner

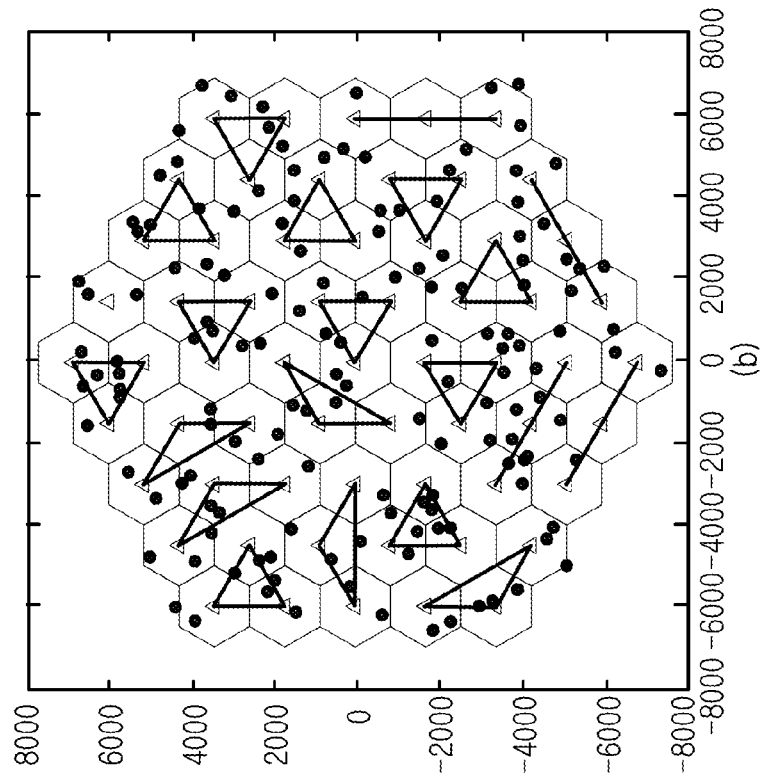
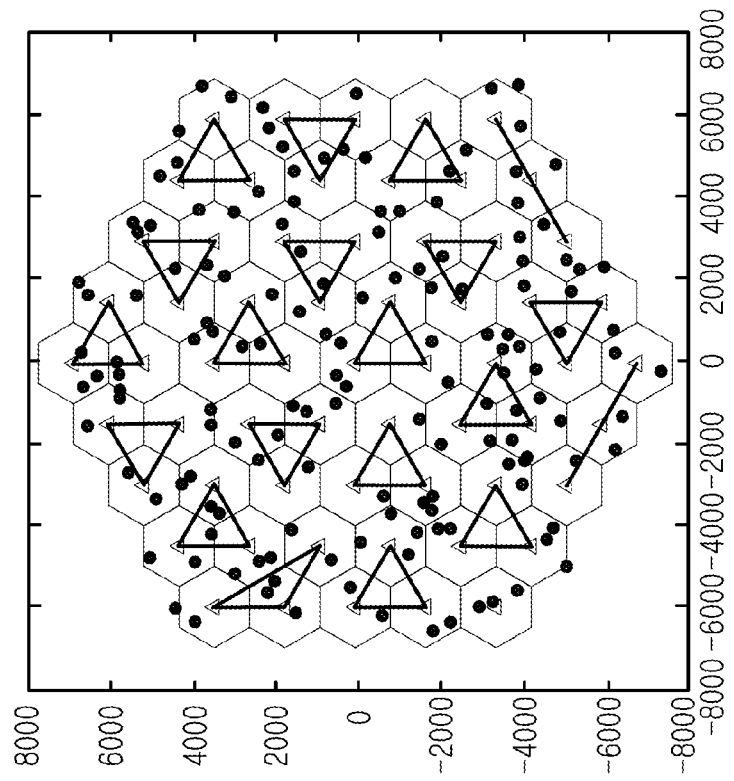
FIG. 2A
FIG. 2B

METHOD AND APPARATUS FOR PERFORMING COORDINATED MULTI-POINT TRANSMISSION AND RECEPTION IN WIRELESS COMMUNICATION SYSTEM

PRIORITY

This application claims the benefit under 35 U.S.C. §119 (a) of a Korean patent application filed in the Korean Intellectual Property Office on Nov. 24, 2009, and assigned Serial No. 10-2009-0113886, the entire disclosure of which is hereby incorporated by reference.

BACKGROUND OF THE INVENTION

1. Field of the Invention

The present invention relates to a Coordinated Multi-Point (CoMP) transmission. More particularly, the present invention relates to a method and an apparatus for selecting a base station for CoMP communication in a cell clustering group of a wireless communication system.

2. Description of the Related Art

Techniques for managing inter-cell interference may be divided largely into interference randomization, interference cancellation, and interference coordination/avoidance. The interference randomization technique does not allow packets of other users to affect a channel decoding process by means of a cell-specific scrambling and a cell-specific interleaving. The interference cancellation performs Successive Interference Cancellation (SIC) based on the encoding packet, or removes the interference using multiple antennas or multiple resources based on the symbol. The interference coordination is based on cell planning or frequency planning, and changes a frequency reuse coefficient according to a terminal's location in the cell or the interference. The interference coordination may coordinate the resource allocation according to directionality of the interference.

In regard to the interference coordination scheme, a method for changing the resource allocation status per cell is suggested so as to adapt to environmental changes such as cell layout, varying traffic condition, and cell addition/deletion. The $3^{rd}$ Generation Partnership Project (3GPP) Long Term Evolution (LTE) standard designates high interference or low transmit power with respect to a specific resource per cell. In addition, an Overload Indicator (OI) informing of a considerable interference situation for the uplink is defined, wherein each base station informs its neighboring base stations of the information.

In addition to the above-stated inter-cell interference cancellation techniques, Coordinated Multi-Point (CoMP) transmission techniques are suggested. According to the CoMP transmission/reception, one User Equipment (UE) communicates with a plurality of e-Node Bs (eNBs) so as to raise the throughput in the cell boundary or the throughput of the whole system. In the CoMP transmission/reception, while the coordinated communication of all base stations around a specific UE is the best way to raise the throughput, its applicability is quite low because of computational complexity and scheduling issues among the base stations. In this regard, a cell clustering method is suggested, which performs the CoMP communication by gathering some base stations around the specific UE into one group (hereafter, referred to as a CoMP set).

A conventional cell clustering method is practicable by lowering the complexity in the ideal CoMP transmission/reception environment. However, there may coexist a plurality of UEs for the CoMP transmission/reception and a plurality of UEs not supporting the CoMP transmission/reception within the cell.

Therefore, a need exists for a method and an apparatus for selecting a base station to raise system efficiency in CoMP transmission after cell clustering in an uplink of a wireless communication system.

SUMMARY OF THE INVENTION

An aspect of the present invention is to address at least the above-mentioned problems and/or disadvantages and to provide at least the advantages described below. Accordingly, an aspect of the present invention is to provide a method and an apparatus for efficient Coordinated Multi-Point (CoMP) communication in a wireless communication system.

Another aspect of the present invention is to provide a method and an apparatus for selecting a base station for CoMP communication in a wireless communication system.

Yet another aspect of the present invention is to provide a method and an apparatus for selecting a base station to raise system efficiency in CoMP transmission after cell clustering in an uplink of a wireless communication system.

According to one aspect of the present invention, an operating method of a base station for a CoMP transmission in a wireless communication system is provided. The method includes performing a cell clustering for CoMP transmission of a terminal, receiving a reference signal from the terminal and determining cell IDentifier (ID) information of the terminal, when the terminal uses a cell ID for the CoMP transmission and reception, comparing a Channel Quality Indicator (CQI) value of the reference signal with a threshold, and when the CQI value of the reference signal is greater than or equal to the threshold, participating in the CoMP transmission of the terminal.

According to another aspect of the present invention, an operating method of a terminal for a CoMP transmission in a wireless communication system is provided. The method includes determining whether to support the CoMP transmission, and when supporting the CoMP transmission, transmitting a reference signal to a base station using a cell ID for the CoMP transmission and reception.

According to yet another aspect of the present invention, a system for performing a CoMP transmission in a wireless communication system is provided. The system includes a plurality of base stations for forming a cell clustering group and for participating in the CoMP transmission of a terminal, and the terminal for transmitting the CoMP transmission to the cell clustering group. Each of the base stations determines cell ID information of a corresponding terminal by receiving a reference signal from the terminal, compares a CQI value of the reference signal with a threshold when the corresponding terminal uses a cell ID for the CoMP transmission, and participates in the CoMP transmission of the terminal when the CQI value of the reference signal is greater than or equal to the threshold, and wherein the terminal determines whether to support the CoMP transmission, and when supporting the CoMP transmission, transmits a reference signal to the plurality of base stations using a cell ID for the CoMP transmission and reception.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIGS. 2A and 2B are diagrams of a semi-fixed cell clustering of cell clustering for CoMP communication according to an exemplary embodiment of the present invention;

Throughout the drawings, like reference numerals will be understood to refer to like parts, components and structures.

DETAILED DESCRIPTION OF EXEMPLARY EMBODIMENTS

Figure 1A:
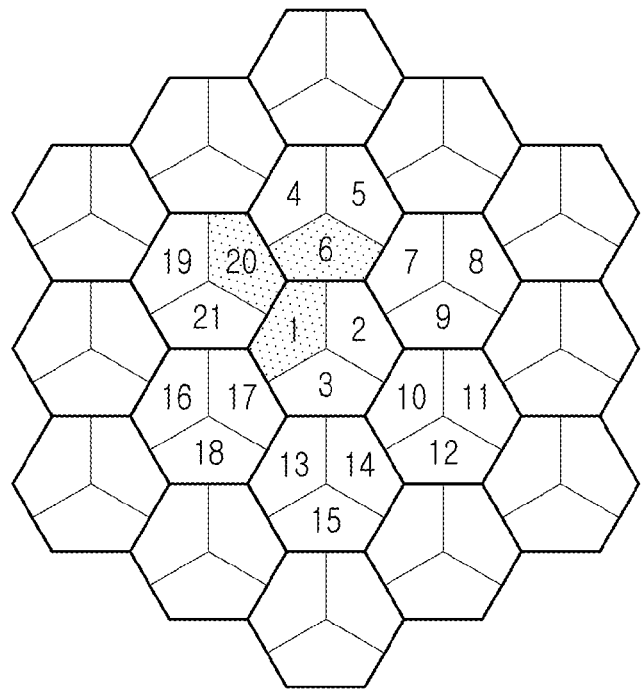
FIG. 1A is a diagram of a fixed clustering of cell clustering for Coordinated Multi-Point (CoMP) communication according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide a method and an apparatus for selecting a base station for efficient Coordinated Multi-Point (CoMP) transmission in a wireless communication system. Hereafter, explanations are based on a Long Term Evolution (LTE) system. Note that the present invention is applicable to other cellular communication systems such as Global System for Mobile (GSM) communication systems, Wideband Code Division Multiple Access (WCDMA) systems, and Institute of Electrical and Electronics Engineers (IEEE) 802.16 systems.

FIGS. 1 to 5, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly state otherwise. A set is defined as a non-empty set including at least one element.

FIG. 1A illustrates a fixed clustering of cell clustering for CoMP communication according to an exemplary embodiment of the present invention.

Referring to FIG. 1A, three sectors form a single fixed clustering group. Here, each of fixed clustering groups (1, 6, 20), (2, 9, 10), (3, 13, 17) comprises a fixed clustering group. For example, User Equipments (UEs) in the fixed clustering group (1, 6, 20) performs the CoMP transmission with the sectors 1, 6, and 20. The fixed clustering method is easy to implement but is limited in its ability to enhance the throughput due to the limited degree of freedom.

Figure 1B:
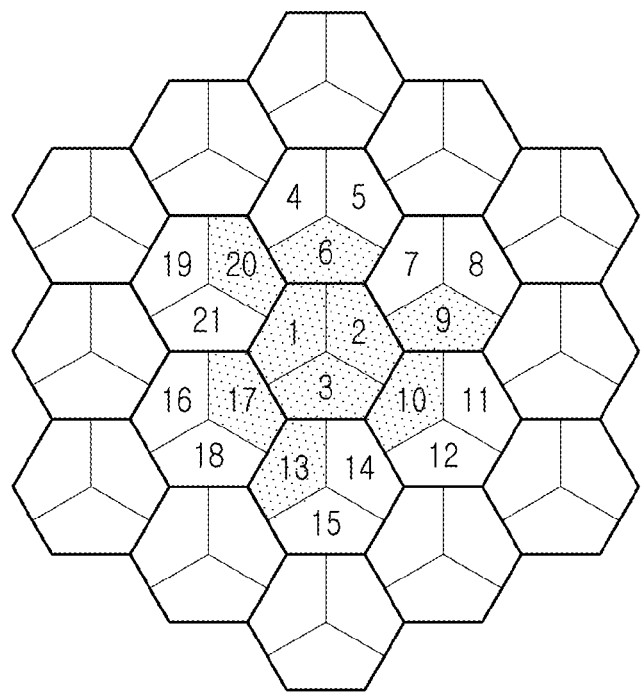
FIG. 1B is a diagram of a User Equipment (UE)-specific clustering of cell clustering for CoMP communication according to an exemplary embodiment of the present invention.

FIG. 1B illustrates a UE-specific clustering of cell clustering for CoMP communication according to an exemplary embodiment of the present invention.

Referring to FIG. 1B, the UE-specific clustering performs the cell clustering using more cells per cluster than the number of cells used in the fixed cluster group of FIG. 1A. For example, in the UE-specific clustering, three fixed clustering groups support the CoMP transmission for a specific UE.

FIGS. 2A and 2B illustrate a semi-fixed cell clustering of cell clustering for CoMP transmission according to an exemplary embodiment of the present invention.

The semi-fixed cell clustering of FIGS. 2A and 2B dynamically changes the cell clustering group at $t_1$ and $t_2$ in an environment where three cells form one clustering group. FIG. 2A illustrates the cell clustering group at $t_1$ and FIG. 2B illustrates the cell clustering group at $t_2$.

More specifically, upon triggering the dynamic cell clustering, the UE monitors the Inter-Cell-Interference (ICI) from neighboring cells and reports the ICI information to the network, so that the network may determine an appropriate clustering.

Figure 3:
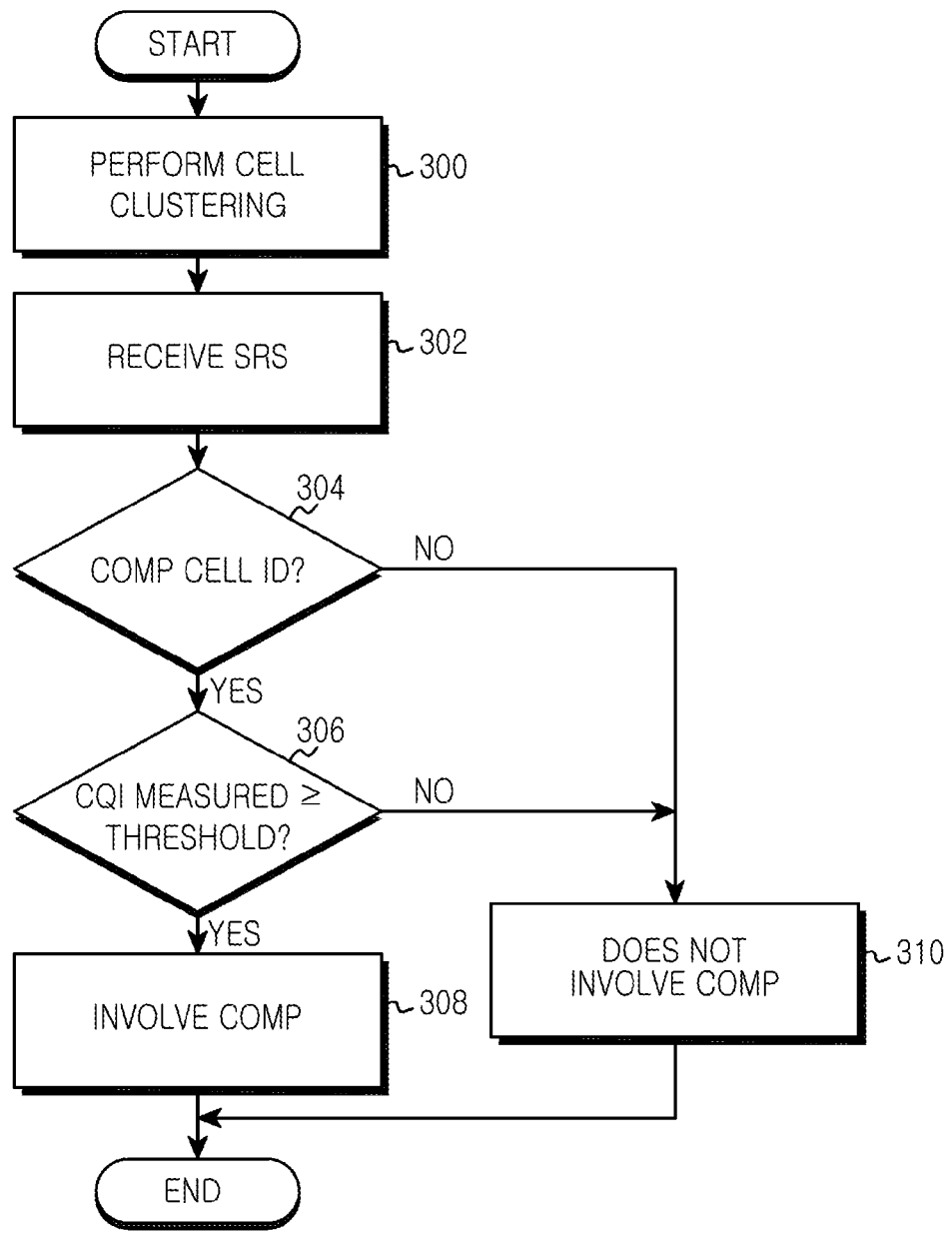
FIG. 3 is a flowchart of operations of a base station for efficient CoMP transmission/reception in a wireless communication system according to an exemplary embodiment of the present invention.

FIG. 3 illustrates a flowchart of operations of a base station for efficient CoMP transmission/reception in a wireless communication system according to an exemplary embodiment of the present invention.

Referring to FIG. 3, the base station determines the cell clustering group with neighboring base stations and supports the CoMP transmission of the terminal in step 300. The cell clustering is based on one of the fixed clustering of FIG. 1A, the UE-specific clustering of FIG. 1B, and the semi-fixed cell clustering of FIGS. 2A and 2B. In an exemplary implementation, the cell clustering may adopt other cell clustering.

In step 302, the base station receives a Sounding Reference Signal (SRS) from the terminal.

In step 304, the base station determines whether a cell IDentifier (ID) of the terminal is a cell ID for the CoMP transmission. According to whether the CoMP transmission of the terminal is supported, the base station may determine whether to allocate the terminal the cell ID for the CoMP transmission or a general cell ID. That is, the cell ID for the CoMP transmission is used differently from the general cell ID, according to a predefined rule between the base station and the terminal.

If it is determined in step 304 that the terminal uses the cell ID for the CoMP transmission, the base station measures and compares a Channel Quality Indicator (CQI) of the SRS with a threshold in step 306. In contrast, if it is determined in step 304 that the terminal does not use the cell ID for the CoMP transmission, the base station does not get involved in the CoMP transmission in step 310. That is, the base station is excluded from the cell clustering group.

More particularly, each base station in the CoMP set (the cell clustering group determined in step 300) measures the CQI based on the SRS sent from the terminal, and only the base station measuring the CQI greater than the threshold level gets involved in the CoMP transmission. Based on the SRS, the base station may determine whether the terminal is the CoMP supporting terminal or the non-CoMP terminal.

If it is determined in step 306 that the measured CQI value is greater than or equal to the threshold, the base station supports the CoMP transmission of the terminal in step 308. That is, the base station belongs to the cell clustering group and supports the CoMP transmission/reception of the terminal.

In contrast, if it is determined in step 306 that the measured CQI is less than the threshold, the base station does not support the CoMP transmission/reception of the terminal in step 310. Namely, the base station is excluded from the cell clustering group. Herein, the base station excluded from the cell clustering group can efficiently utilize the system resource by involving the terminal not supporting the CoMP transmission/reception or other CoMP transmission/reception.

After determining the cell clustering group, the base station belonging to the cell clustering group determines whether to participate in the cell clustering group by measuring the SRS of each terminal. In an exemplary implementation, before determining the cell clustering group, the base station can determine the cell clustering group by sharing the CQI measured by the base stations as shown in FIG. 4.

Figure 4:
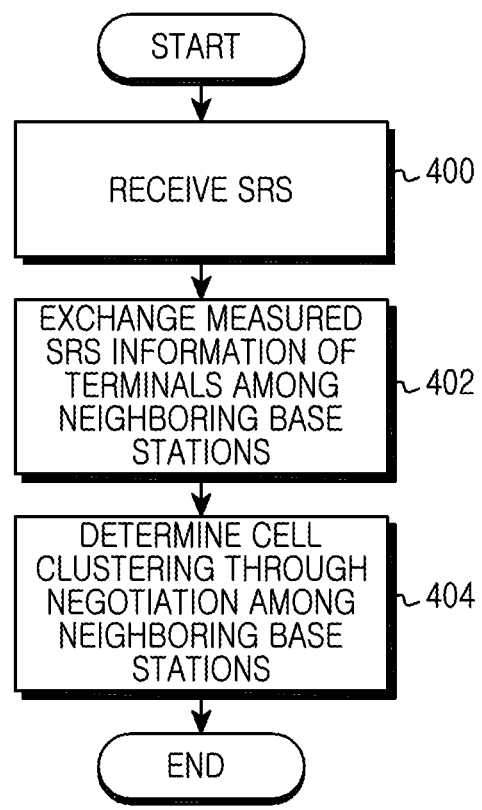
FIG. 4 is a flowchart of operations of a base station for efficient CoMP transmission/reception in a wireless communication system according to another exemplary embodiment of the present invention.

FIG. 4 illustrates a flowchart of operations of a base station for efficient CoMP transmission in a wireless communication system according to another exemplary embodiment of the present invention.

Referring to FIG. 4, the base station receives the SRS from the terminal in step 400.

In step 402, the base station determines whether to get involved in the CoMP transmission based on the measured SRS, and notifies the determination to the terminal. In an exemplary implementation, the base station can negotiate with its neighboring BSs for the CoMP transmission/support of the terminal in step 402, determine the cell clustering group by negotiating with the neighboring base stations in step 404, and inform the terminal of the base station information of the CoMP transmission.

Figure 5:
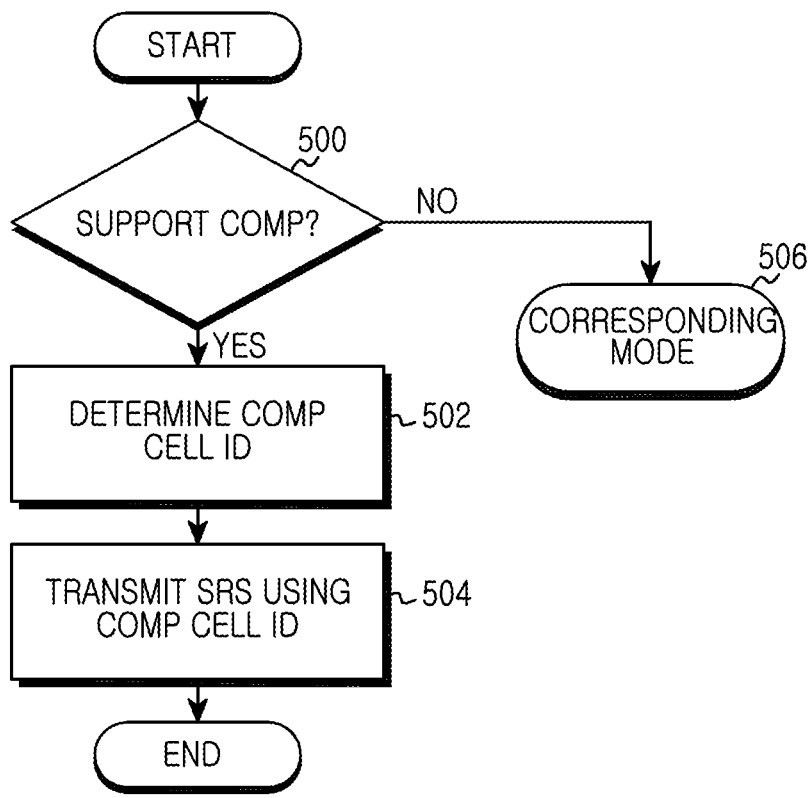
FIG. 5 is a flowchart of operations of a terminal for efficient CoMP transmission/reception in a wireless communication system according to an exemplary embodiment of the present invention.

FIG. 5 illustrates a flowchart of operations of a terminal for efficient CoMP transmission/reception in a wireless communication system according to an exemplary embodiment of the present invention.

Referring to FIG. 5, whether the terminal supports the CoMP transmission is determined in step 500. If it is determined in step 500 that the terminal supports the CoMP transmission, the terminal determines the cell ID for the CoMP transmission in step 502. The cell ID for the CoMP transmission/reception is determined through the negotiation in the network entry/re-entry between the terminal and the base station.

In contrast, if it is determined in step 500 that that the terminal does not support the CoMP transmission/reception, the terminal proceeds to a corresponding mode in step 506, in which the terminal communicates with one serving base station.

In step 504, the terminal sends the SRS to the base station using the cell ID for the CoMP transmission/reception As set forth above, only the base station having the good channel environment in the CoMP set in the uplink involves the CoMP communication. Thus, the complexity of the system can be lowered and the remaining resources can be used efficiently.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An operating method of a base station for a Coordinated Multi-Point (CoMP) transmission in a wireless communication system, the method comprising:
   receiving, from a terminal, a sounding reference signal (SRS) generated by using a cell identifier (ID);
   measuring, if the cell ID is identical to a cell ID for the CoMP transmission, a channel quality between the base station and the terminal based on the SRS; and
   transmitting, to the terminal, if the channel quality is greater than a designated value, a notification message informing that the base station participates in the CoMP transmission for the terminal.

2. The method of claim 1, wherein the cell ID indicates whether the terminal supports the CoMP transmission.

3. The method of claim 1, further comprising:
   transmitting, to the terminal, if the cell ID is different from a cell ID for the CoMP transmission, a notification message informing that the base station does not participate in the CoMP transmission for the terminal.

4. The method of claim 1, further comprising:
   receiving at least one information for channel quality between at least one neighboring base station and the terminal; and
   generating, based on the at least one information, a cell clustering group for the CoMP transmission.

5. The method of claim 1, further comprising:
   transmitting, to the terminal, if the channel quality is less than or equal to the designated value, a notification message informing that the base station does not participate in the CoMP transmission for the terminal.

6. The method of claim 1, wherein the cell for the CoMP transmission is distinguished from a general cell ID according to a predefined rule between the base station and the terminal.

7. An operating method of a terminal for a Coordinated Multi-Point (CoMP) transmission in a wireless communication system, the method comprising:
   transmitting, to a base station, a sounding reference signal (SRS) generated by using a cell identifier (ID); and
   receiving, from the base station, a notification message informing that the base station participates in the CoMP transmission for the terminal, wherein the notification message is transmitted from the base station if a channel quality between the base station and the terminal is greater than a designated value, and wherein the channel quality is measured based on the SRS if the cell ID is identical to a cell ID for the CoMP transmission.

8. The method of claim 7, wherein the cell ID indicates whether the terminal supports the CoMP transmission.

9. The method of claim 7, further comprising:
receiving, from the base station, a notification message informing that the base station does not participate in the CoMP transmission for the terminal if the cell ID is different from a cell ID for the CoMP transmission.

10. The method of claim 7, further comprising:
receiving, from the base station, a notification message informing that the base station does not participate in the CoMP transmission for the terminal if the channel quality is less than or equal to the designated value.

11. The method of claim 7, wherein the cell ID for the CoMP transmission is distinguished from a general cell ID according to a predefined rule between the base station and the terminal.

12. An apparatus of a base station for a Coordinated Multi-Point (CoMP) transmission in a wireless communication system, the apparatus comprising:
at least one transceiver; and
at least one processor coupled to the at least one transceiver,
wherein the at least one processor is configured to:
receive, from a terminal, a sounding reference signal (SRS) generated by using a cell identifier (ID),
measure, if the cell ID is identical to a cell ID for the CoMP transmission, a channel quality between the base station and the terminal based on the SRS, and
transmit, to the terminal, if the channel quality is greater than a designated value, a notification message informing that the base station participates in the CoMP transmission for the terminal.

13. The apparatus of claim 12, wherein the at least one processor is further configured to:
transmit, to the terminal, if the cell ID is different from a cell ID for the CoMP transmission, a notification message informing that the base station does not participate in the CoMP transmission for the terminal.

14. The apparatus of claim 12, wherein the at least one processor is further configured to:
transmit, to the terminal, if the channel quality is less than or equal to the designated value, a notification message informing that the base station does not participate in the CoMP transmission for the terminal.

15. The apparatus of claim 12, wherein the at least one processor is further configured to:
receive at least one information for channel quality between at least one neighboring base station and the terminal; and
generate, based on the at least one information, a cell clustering group for the CoMP transmission.

16. An apparatus of a terminal for a Coordinated Multi-Point (CoMP) transmission in a wireless communication system, the apparatus comprising:
at least one transceiver; and
at least one processor coupled to the at least one transceiver,
wherein the at least one processor is configured to:
transmit, to a base station, a sounding reference signal (SRS) generated by using a cell identifier (ID), and
receive, from the base station, a notification message informing that the base station participates in the CoMP transmission for the terminal,
wherein the notification message is transmitted from the base station if a channel quality between the base station and the terminal is greater than a designated value, and
wherein the channel quality is measured based on the SRS if the cell ID is identical to a cell ID for the CoMP transmission.

17. The apparatus of claim 16, wherein the cell ID indicates whether the terminal supports the CoMP transmission.

18. The apparatus of claim 16, wherein the at least one processor is further configured to:
receive, from the base station, a notification message informing that the base station does not participate in the CoMP transmission for the terminal if the cell ID is different from a cell ID for the CoMP transmission.

19. The apparatus of claim 16, wherein the at least one processor is further configured to:
receive, from the base station, a notification message informing that the base station does not participate in the CoMP transmission for the terminal if the channel quality is less than or equal to the designated value.

20. The apparatus of claim 16, wherein the cell ID for the CoMP transmission is distinguished from a general cell ID according to a predefined rule between the base station and the terminal.

* * * * *